United States Patent
Smith

(10) Patent No.: US 9,335,921 B2
(45) Date of Patent: May 10, 2016

(54) PROVIDING SUBPAGES IN A TOUCH PANEL USER INTERFACE

(75) Inventor: George Carl Smith, Grapevine, TX (US)

(73) Assignee: AMX LLC, Richardson, TX (US)

( * ) Notice: Subject to any disclaimer, the term of this patent is extended or adjusted under 35 U.S.C. 154(b) by 1004 days.

(21) Appl. No.: 13/493,122

(22) Filed: Jun. 11, 2012

(65) Prior Publication Data

US 2012/0313876 A1    Dec. 13, 2012

Related U.S. Application Data

(60) Provisional application No. 61/495,476, filed on Jun. 10, 2011.

(51) Int. Cl.
| | |
|---|---|
| G06F 3/041 | (2006.01) |
| G06F 3/0488 | (2013.01) |
| G06F 9/44 | (2006.01) |
| G06F 3/0483 | (2013.01) |
| G06F 3/0485 | (2013.01) |

(52) U.S. Cl.
CPC .......... *G06F 3/04883* (2013.01); *G06F 3/0483* (2013.01); *G06F 3/0485* (2013.01); *G06F 9/4443* (2013.01)

(58) Field of Classification Search
CPC . G06F 9/4443; G06F 3/04883; G06F 3/0485; G06F 3/0483
USPC .......................................................... 345/173
See application file for complete search history.

(56) References Cited

U.S. PATENT DOCUMENTS

2011/0252375 A1* 10/2011 Chaudhri ....................... 715/835

\* cited by examiner

*Primary Examiner* — Gustavo Polo

(57) ABSTRACT

Disclosed are an apparatus and method of retrieving subpages from memory and rendering the subpages for display on a user display device, such as a smartphone or other display with limited viewing area. The method may also include identifying each of the subpages as being part of a sequence of subpages and displaying a first portion of the subpages on the display and storing a remaining portion of the subpages in the memory as rendered and ready for display.

17 Claims, 9 Drawing Sheets

PROVIDING SUBPAGES IN A TOUCH PANEL USER INTERFACE

CROSS-REFERENCE TO RELATED APPLICATIONS

This invention is related to and claims priority to provisional application Ser. No. 61/495,476, filed on Jun. 10, 2011, entitled "Subpages in a Touch Panel User Interface for Control Systems", the entire contents of which are hereby incorporated by reference.

TECHNICAL FIELD OF THE INVENTION

This invention relates to a method and apparatus of providing subpages to a user interface, and more particularly, to processing subpages on and off the present display area of a user display interface.

BACKGROUND OF THE INVENTION

Conventionally, touch panel or touch screen architecture is based on the concept of a page. A page represents the viewing area of a liquid crystal display (LCD) screen and is composed of a background image or color with overlaid buttons. There are numerous button types, and buttons can be configured with options, such as size, placement, color, border, transparency, etc. Buttons can be as simple as on/off and as complex as video windows.

Nevertheless, buttons and pages have several limitations when compared with current user interfaces on consumer touch devices. For example, buttons must be fixed on a page and cannot be moved, and pages cannot be moved or scrolled. There is no repository used to store off-screen graphics or buttons that can be moved into view when desired.

A popup page is smaller than a full screen page and may be displayed over a page. Popups can also be moved around the screen. However, current popup implementations still have various limitations. Several popups can be displayed over a page at one time, but if any one of the popup pages is moved, the other pages stay in place. Popups can be grouped together but only one at a time can be displayed from the associated group. Popups cannot be moved offscreen or moved onto a screen in a scrolling manner as the content on screen at any given time is the only content readily available.

SUMMARY OF THE INVENTION

One embodiment of the present invention may include a method that includes retrieving a plurality of subpages from memory and rendering the plurality of subpages. The method may also include identifying each of the plurality of subpages as being part of a sequence of subpages and displaying a first portion of the plurality of subpages on a display of a computing device and storing a remaining portion of the plurality of subpages in the memory as rendered and ready for display.

Another example embodiment of the present invention may include an apparatus that includes a memory, a display and a processor configured to retrieve a plurality of subpages from the memory, and render the plurality of subpages. The processor may also be configured to identify each of the plurality of subpages as being part of a sequence of subpages, display a first portion of the plurality of subpages on the display, and store a remaining portion of the plurality of subpages in the memory as rendered and ready for display.

DETAILED DESCRIPTION OF THE INVENTION

Figure 1:
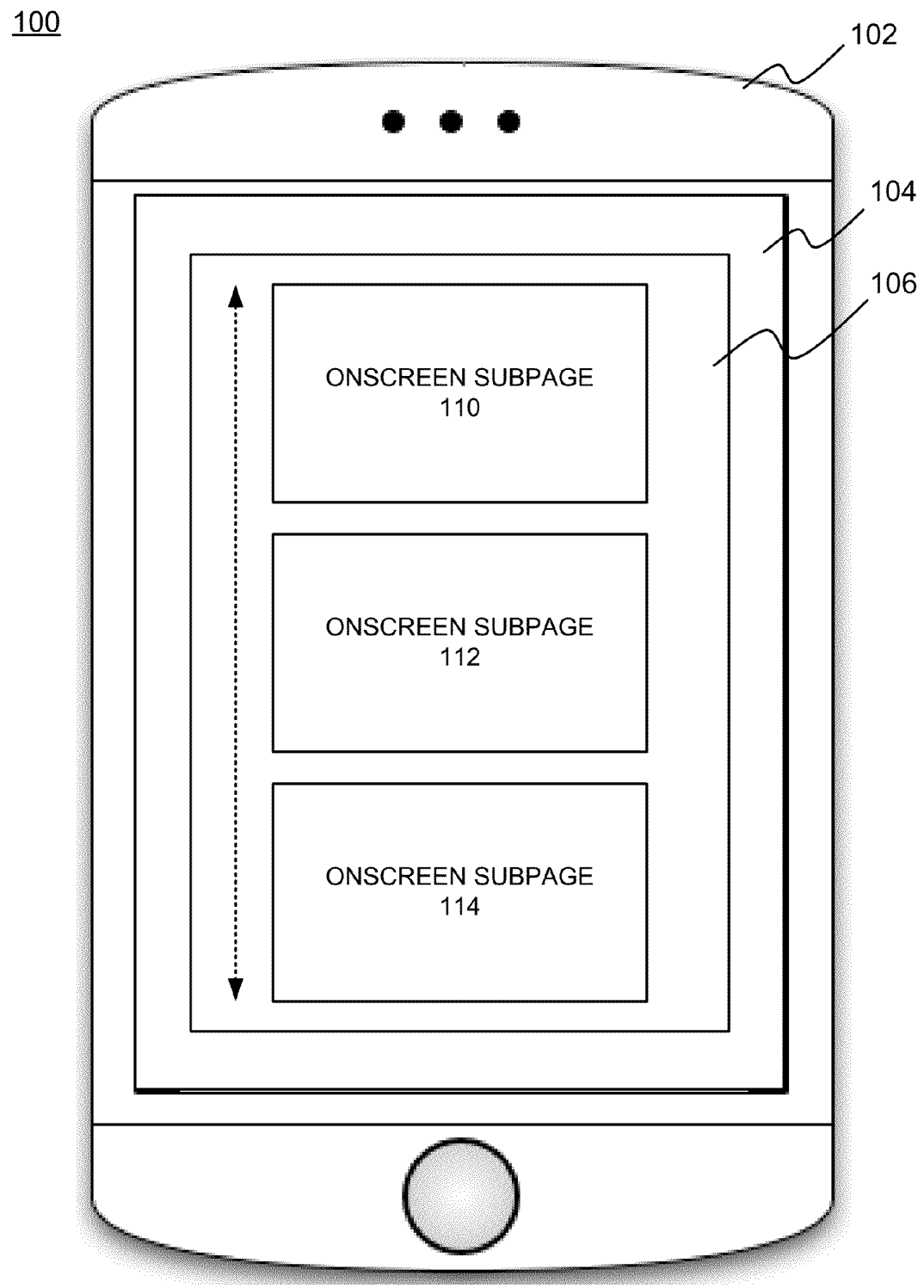
FIG. 1 illustrates example user display area of a smartphone, according to example embodiments of the present invention.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as, packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

According to example embodiments of the present invention, touch panel firmware may be implemented to support multiple popup pages on a screen, as subpages would be implemented as a variation of popup pages in the firmware. The difference between the subpages and the popup pages is that the subpages can be linked together so that as one subpage is being moved/shifted/scrolled by the user, other subpages in the group will move in synchronization both on and off the screen. As the group is being moved off the screen, other subpages in sequence will move onto the screen from the respective edge in a circular manner that recycles the next subpage in the sequence regardless of whether it is on or off the screen at any given time.

According to example embodiments, the page design software, firmware and hardware supports pages, popup pages and subpages. Popup pages can be optionally placed into groups. For subpages this is not optional. It is understood that they are always part of a collection. Within each group, the subpage size and sequence order are specified. All subpages within a group are the same size. Other than the size requirement, each individual page within the group can be uniquely designed and laid out according to a display area interface of a user device (i.e., smartphone).

FIG. 1 illustrates example user display area of a smartphone, according to example embodiments of the present invention. Referring to FIG. 1, the device casing 102 include a viewable display area 104 that includes a predefined subpage view region 106. One or more subpages 110, 112 and 114 may be viewable at any given time within the subpage view region 106. The user may scroll vertically or horizontally on the touch screen interface overlaying the subpage view region 106 to change the current subpage windows currently displayed.

A specific button type may be used for a subpage viewer. This button is configured to contain and display subpages and is placed on a normal page viewable to a user. Whenever the user navigates to a page that contains the subpage viewer, the subpages, which are implemented as popups, are displayed and activated. Multiple viewer buttons on the same page are permitted. Among the viewer button configuration items would be an associated subpage group, a number of subpages to display at once (rows and columns), a starting subpage including whether or not to reset each time the page is displayed and a screen position. The screen position may permit inter-subpage spacing, allowed scroll parameters including wrap or non-wrap operations, horizontal only, vertical only, all directions, scroll off, etc. Other options may include the display borders, transparency/fill color/3D effects/bounce/acceleration, linear scroll (subpage elements track the finger) and/or a full range scroll.

Typical operation modes of the display interface may include a 'flick' movement across the touch screen interface to move to the next subpage or set of subpages based on a size and count of the particular subpage in a sequence of subpages. Another mode of operation would be the ability to press and move and preview subpages on either side of the current display. The subpages would circularly alternate from side to side as a user manipulates the touch screen device. The display would "snap" a particular subpage into place upon release of a user initiated action (e.g., drag and drop, move left, move right, move up, move down, flick, etc.) based on where the user's finger was positioned when released. Animated motion effects could enhance the appearance of the snap operation.

Users could operate buttons or sliders functions on any of the subpages displayed on their display device without initiating movement to another subpage. According to one example, if each subpage was a single button that filled the subpage viewing area as in the case of the scrolling icon bar then timing parameters would be used to determine whether or not the user meant to scroll the bar or actuate the button. For example, if the user touch detected exceeds two seconds and does not include a movement beyond the originally touched pixels or squares of the display interface.

A subpage viewer button may support the layout of subpages in both rows and columns. This would allow cases such as a column of subpages that can be scrolled vertically or even a grid of icons as is often shown on a smartphone home screen. All of the subpages on the display area are considered active. In addition, all subpages immediately off the screen in the regions which are allowed to be scrolled are also rendered and active in the active device random access memory (RAM) and display processor memory. This caching of on-screen and off-screen subpages allows smooth scrolling operations and the ability to "preview" an off-screen subpage without a cumbersome delay.

According to example embodiments, one example use of the subpage display capabilities would render a scrolling icon bar accessible by the user on the user's display device. For instance, a single row of subpages each of which has an icon button that completely occupies the subpage, the other subpages may be scrolled on and off the display area as if the display had already rendered the images or other content of the subpages. Properly configured subpages along with dynamic content may appear as list boxes to the user.

According to other example embodiments, a normal mode of operation may include all subpages to be moved together and maintained at their specified sequence position (i.e., 1, 2, 3, 4 . . . N). By including dynamic re-ordering, a subpage's position in the sequence can be changed. Two examples of performing such re-ordering may include activating a press and hold function of the subpage for several seconds and/or by using a two or three finger touch on the subpage that spans multiple pixels or display squares. As the user moves a subpage around, the other subpages will move away to allow that moved subpage to be placed in a new position. Upon release, the new position is maintained regardless of an original order of subpages.

Another option may be to include graphics hardware acceleration capabilities which would make subpages scalable to fit different sized viewer buttons. This permits the page designer application to place the same content on touch panels of different sizes and resolutions without having to modify the original content. According to another example, dynamic subpage resizing may be used for combining scaled subpages with a modification to the dynamic re-ordering code, which would allow pinch/zoom support of a subpage. As the user resized a given subpage, the other subpages would move into place in a logical manner by automatically resizing in a manner similar to the first resized page.

Figure 2:
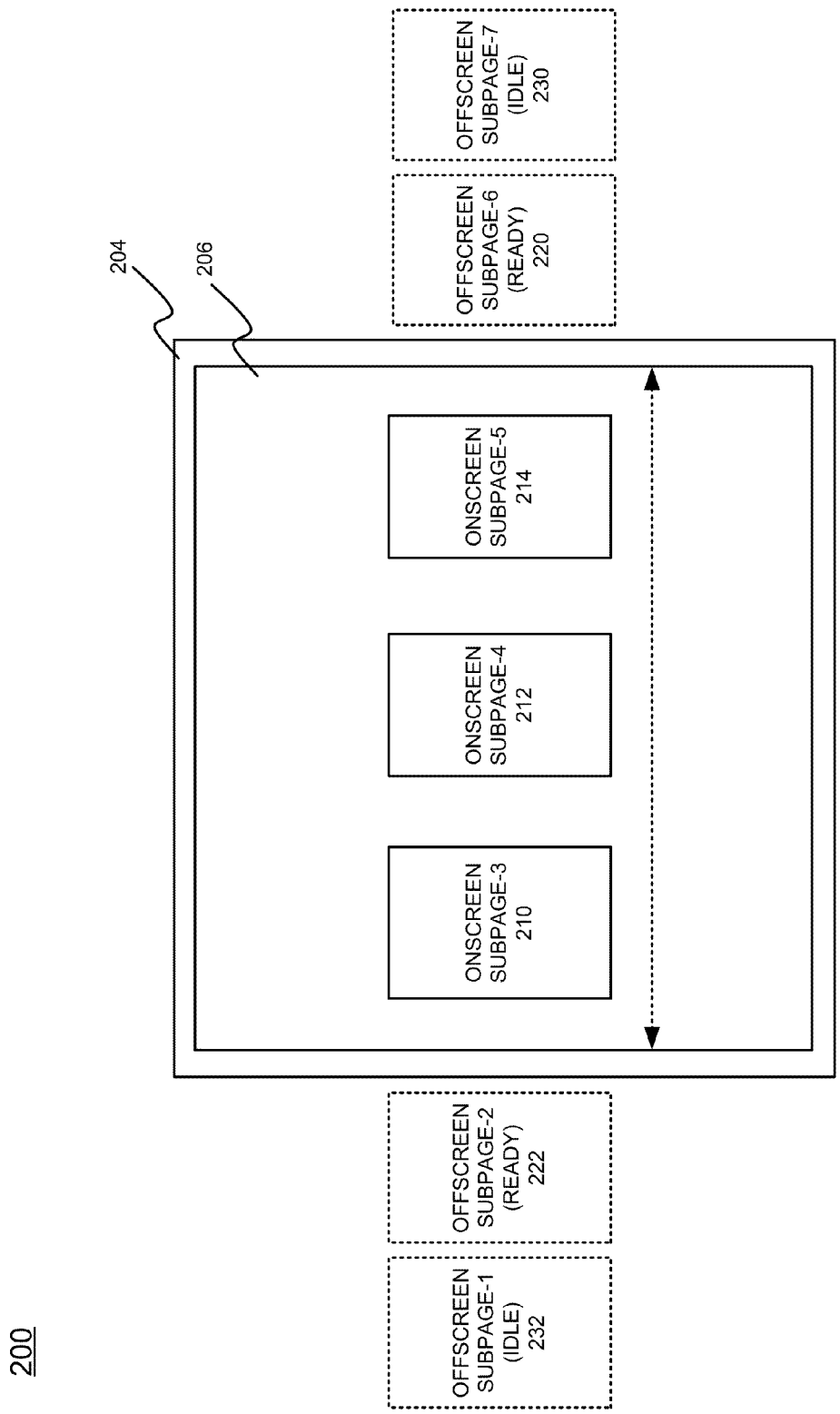
FIG. 2 illustrates an example user display area with off-screen display windows, according to an example embodiment of the present invention.

FIG. 2 illustrates an example user display area with off-screen display windows, according to an example embodiment of the present invention. Referring to FIG. 2, a viewable display area 206 of a user device 204 is illustrated as displaying a plurality of onscreen subpages including subpage-3 210, subpage-4 212 and subpage-5 214. The offscreen subpages 222 and 220 may be cached in memory and viewable once the user scrolls or performs another action to change the current view of the display area 206. The offscreen subpages 232 and 230 further out represent idle subpages which may not be loaded into the video presentation application currently but are stored in a RAM location for easy access and loading when appropriate. The user device may be a computer, laptop, mobile, wireless or cellular phone, a PDA, a tablet, a client a server or any device that contains a processor and/or memory, whether that processor or memory performs a function related to an embodiment of the invention.

The overall LCD screen 204 is configured so that a portion of the screen is defined as the subpage view. The subpage view shows the subpages 210, 212 and 214. If a subpage is onscreen it is shown in a particular default position. If a subpage is offscreen in an adjacent position (ready), it is considered rendered and updated and ready to move back onscreen at any given time. If a subpage is offscreen in a non-adjacent position, such as 232 and 240 it is effectively idle and not currently rendered by a display application.

Figure 3:
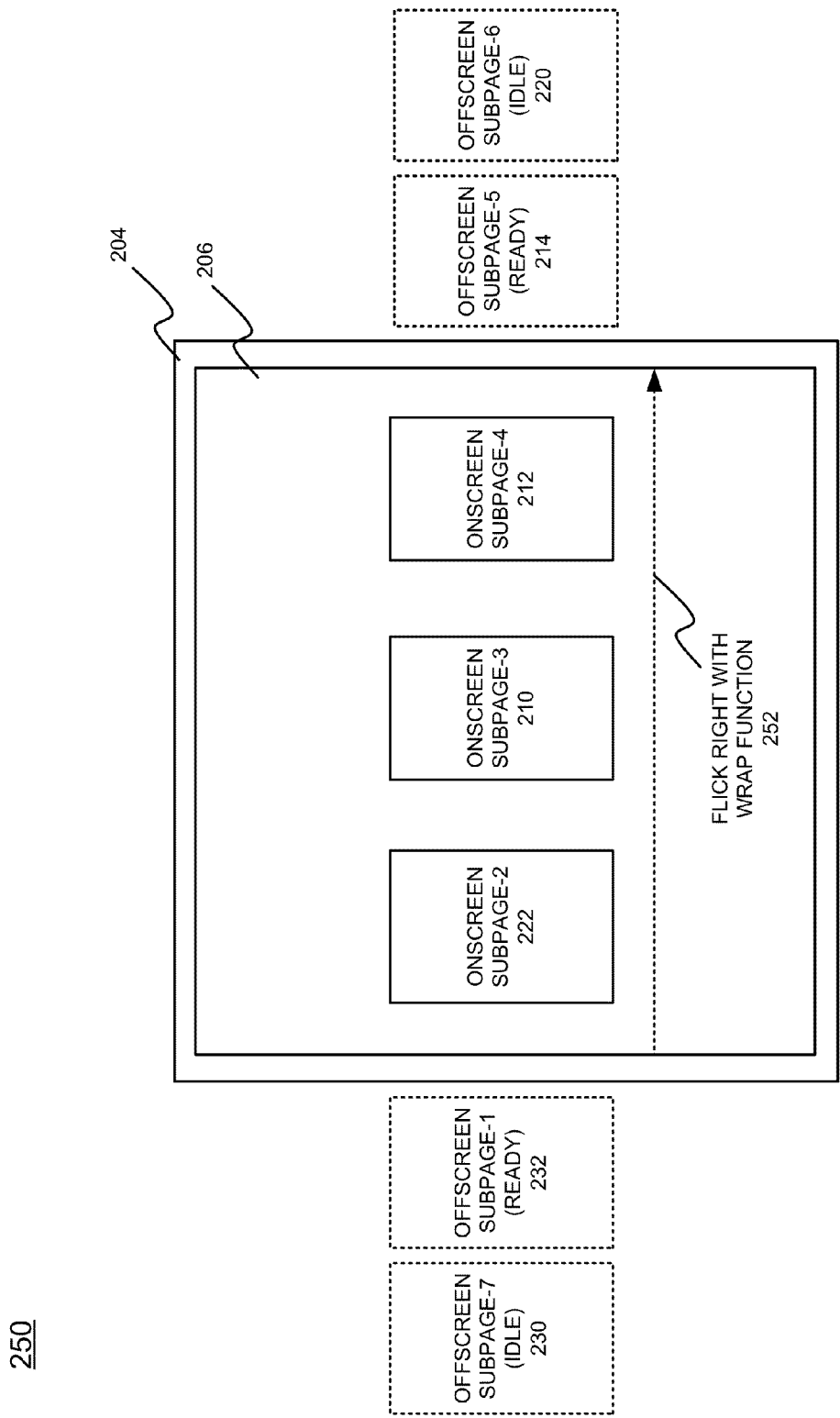
FIG. 3 illustrates an example user display area with off-screen display windows undergoing a right movement user input command, according to an example embodiment of the present invention.

FIG. 3 illustrates an example user display area 250 with offscreen display windows undergoing a right movement user input command, according to an example embodiment of the present invention. Referring to FIG. 3, like reference numerals represent like elements. In this example, the user may have just placed his or her finger on the touch screen panel overlaying the display area 206 and moved it to the right without delay. The wrap function 252 has interpreted the user's rolling or scrolling movement to be a command that scrolls the current view from a previous default view of subpages 210, 212 and 214 to a new view of subpages 222, 210 and 212. The newly added subpage 222 was on a virtual left side of the display prior to the flick right movement, and after the movement to the right it was then brought into view by a processor interpreted command to have the rightmost subpage 214 moved off of the current display area 206.

Subpage view regions respond to a variety of user actions. For example, the "flick" movement may be a user initiated movement to the right or left. In this example of FIG. 3, the rightmost subpage moved offscreen, the center and left subpages will move over one space to the right and the leftmost offscreen adjacent subpage 222 which is rendered and ready to be displayed will move onscreen in the left most position. The leftmost non-adjacent subpage will now move into position offscreen and will no longer be idle but will be rendered and ready to go responsive to the user's right flick gesture/movement. A configurable option will be to wrap the rightmost non-adjacent subpage to the leftmost non-adjacent position. If no wrap was configured, then no more right moving subpage motion would occur when subpage-1 232 was in the leftmost position onscreen.

Figure 4:
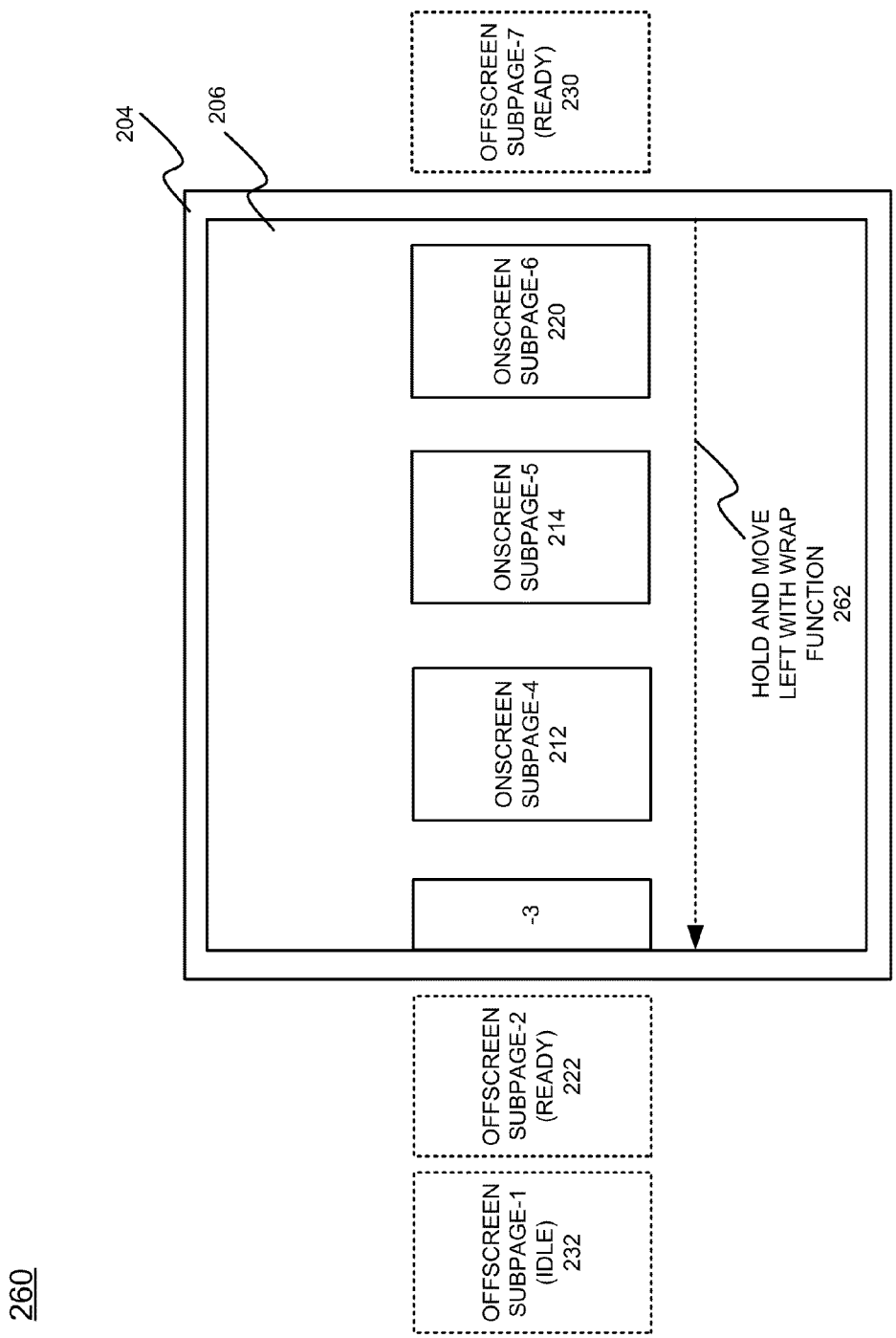
FIG. 4 illustrates an example user display area with off-screen display windows undergoing a hold and move user input command, according to an example embodiment of the present invention.

FIG. 4 illustrates an example user display area with offscreen display windows undergoing a hold and move user input command, according to an example embodiment of the present invention. Referring to FIG. 4, the display example 260 provides for a user initiated press, move and release operation 262 performed on the surface of the display area of the user device. For example, the user may press on a particular region that is contiguous with one or more subpages and move towards the left and then release. As the user is moving their finger, all subpages will track and follow their finger. The leftmost page will start moving offscreen and the rightmost adjacent offscreen page will start moving onto the screen. Depending on where the user releases will determine the final subpage positions. If the user moves the leftmost subpage more than half off the screen, then it will settle offscreen. If not, then the subpages will revert back to their previous positions. This is considered a "preview" mode as you can temporarily preview something offscreen without committing. Obviously, you could move back and forth and preview offscreen subpages on both the left and right without committing.

Figure 5:
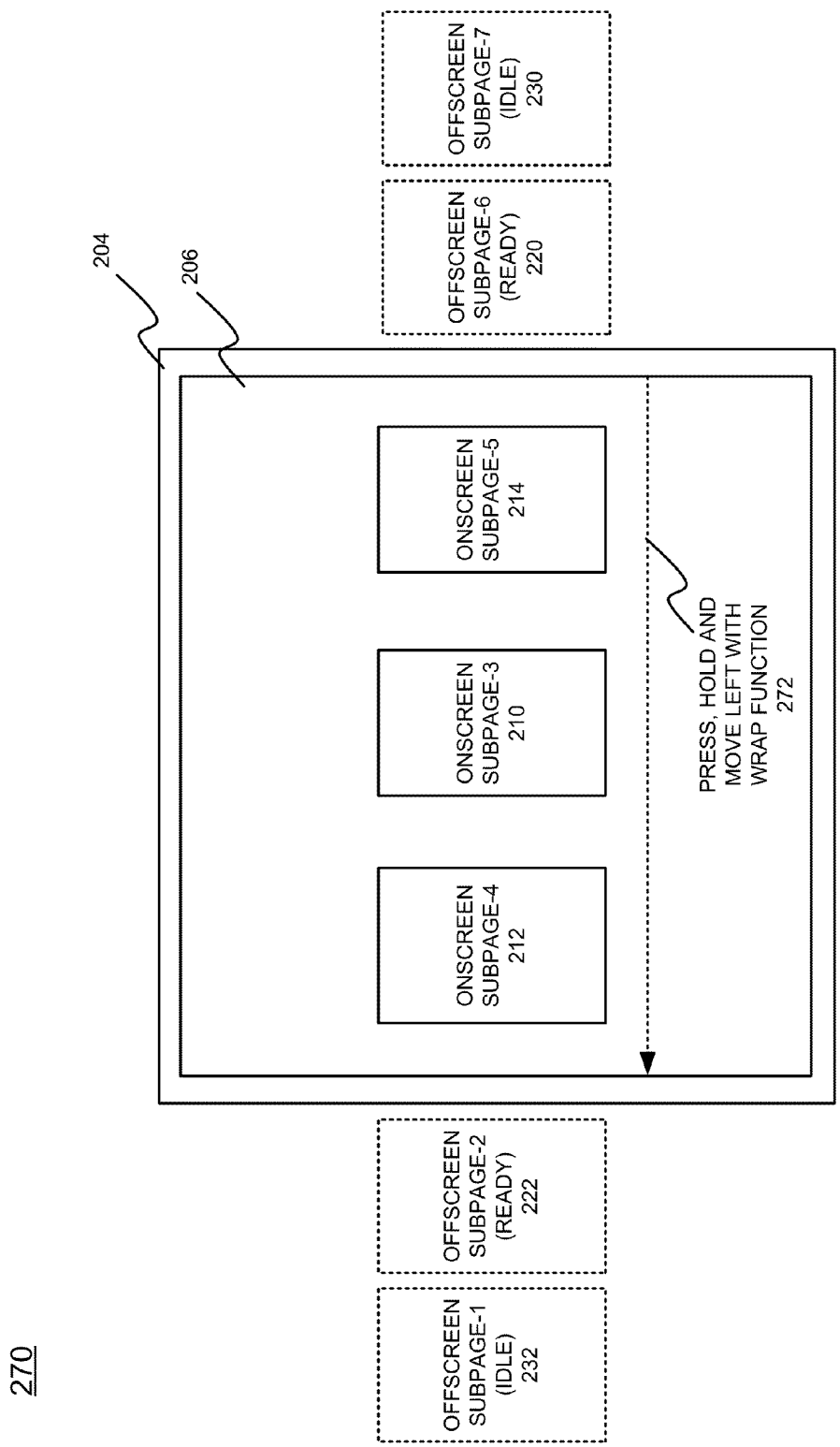
FIG. 5 illustrates an example user display area with off-screen display windows undergoing a press and hold movement user input command, according to an example embodiment of the present invention.

FIG. 5 illustrates an example user display area 270 with offscreen display windows undergoing a press and hold movement user input command, according to an example embodiment of the present invention. Referring to FIG. 5, a user may press, hold for several seconds, then move and release one or more subpages to modify a current order scheme. In this case, the user presses on a subpage, such as 212, and then holds for several seconds before moving and releasing. This operation provides dynamic reordering. For example, the user presses on the center subpage 212 and holds for a configurable amount of time (e.g., 2, 3 seconds, etc.). The subpage 212 would slightly enlarge and become semi-transparent and may be transported to a separate position in the sequence. The example subpage motion is different from previous examples. In previous view modes, all the subpages would move in synchronization with the user initiated motion. However, in dynamic reordering mode, the subpage being held is being moved to a new position. For example, the user may proceed by moving the center page 212 to the left. The leftmost subpage would actually move under the center page toward the right to take the place of the displaced subpage 212. If the user now releases, the previous center subpage 212 will now occupy the leftmost position and the original leftmost page 210 will now occupy the center position. The new sequence order will now be maintained and the ready and idle offscreen pages may remain in their current positions.

Figure 6:
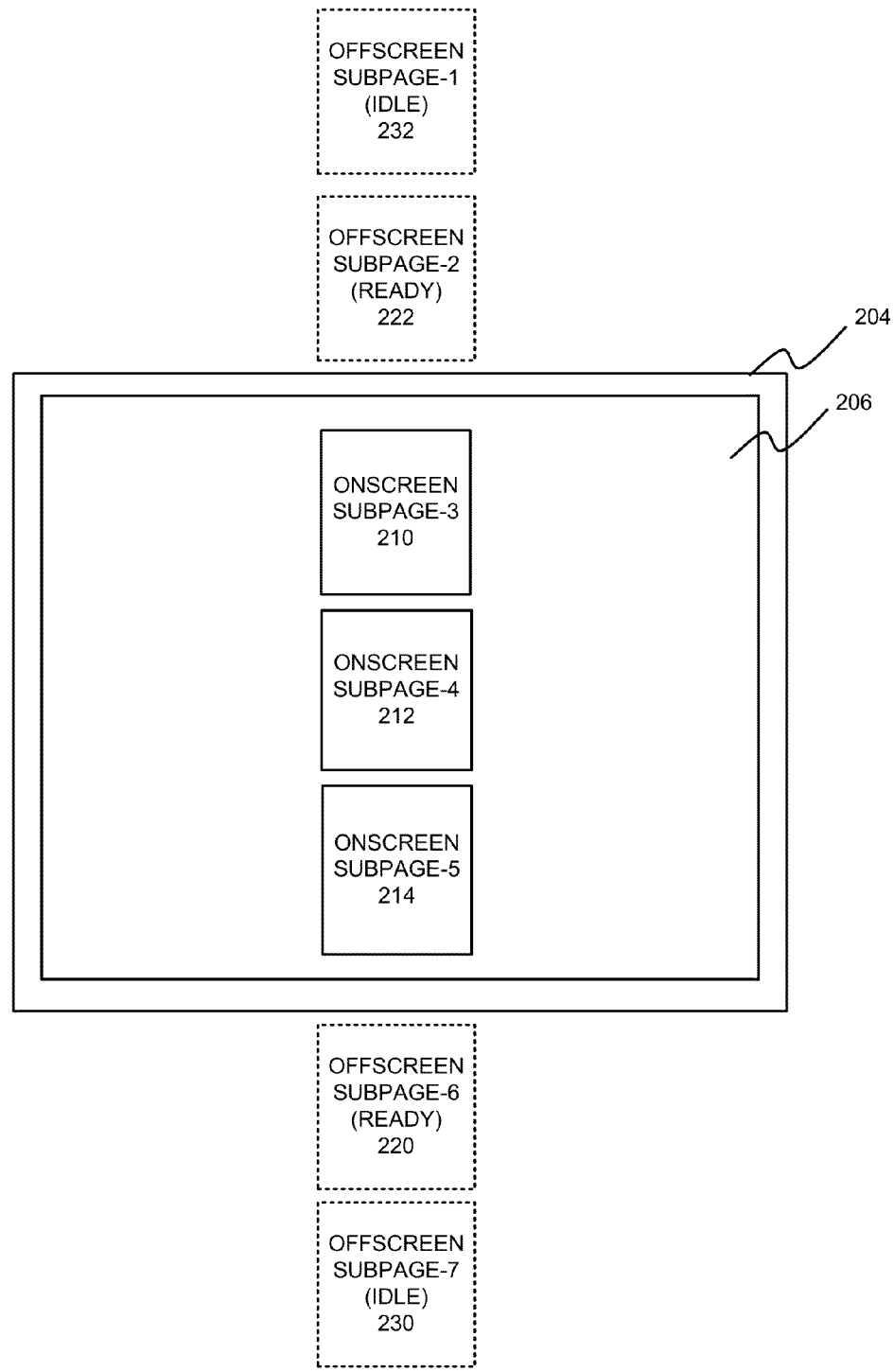
FIG. 6 illustrates an example user display area with off-screen display windows in a vertical configuration, according to an example embodiment of the present invention.

FIG. 6 illustrates an example user display area 280 with offscreen display windows in a vertical display configuration, according to an example embodiment of the present invention. Referring to FIG. 6, although the above-noted examples were directed to horizontal motion and horizontal display areas of computing devices, the subpages and their associated viewing schemes may also be implemented with a vertical arrangement and motion capabilities. In this case, offscreen subpages will be at the top or bottom of the view region.

Figure 7:
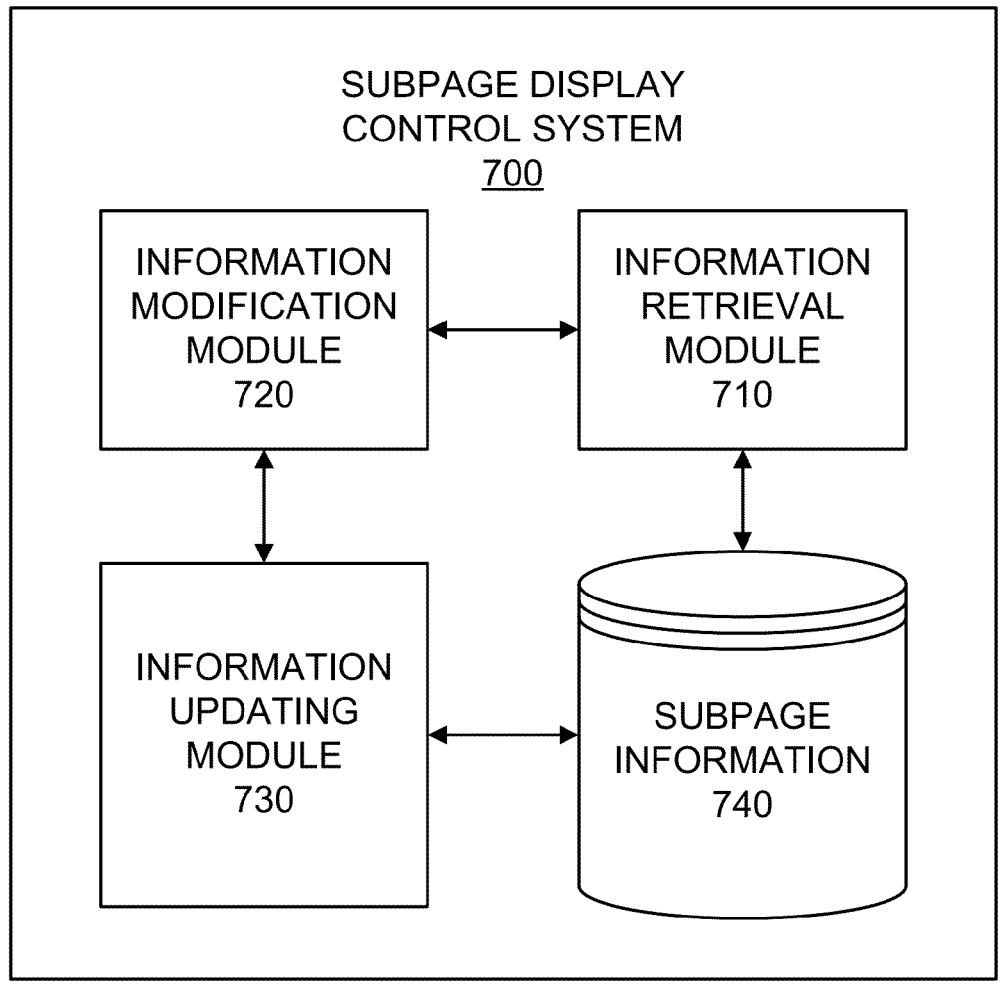
FIG. 7 illustrates an example user subpage processing control system, according to an example embodiment of the present invention.

FIG. 7 illustrates an example user subpage processing control system 700, according to an example embodiment of the present invention. Referring to FIG. 7, the subpage display control system 700 may perform retrieving a plurality of subpages from memory, such as a database 740 of subpage information. The subpages may be previously downloaded images, or webpage files that are cached and stored in memory for quick retrieval. The subpages may be retrieved from memory via the information retrieval module 710 and rendered via the information updating module 720. Each of the subpages may be identified as being part of a sequence of subpages via the information updating module 730, which also displays a first portion of the subpages on a display of a computing device. The subpages displayed may be limited by the screen real estate of the display device and the other subpages may be rendered and stored in RAM as ready for display for quick retrieval if the user initiates a display modification gesture (i.e., movement, flick, hold and move, etc.).

In further operation, a movement command may be received on the display and at least one of the remaining subpages that were not originally displayed on the display may be retrieved from memory and displayed on the display responsive to the movement command received. Examples of movement commands may include a directional flick command (i.e., right, left, up, down). As a result, the sequence of subpages may be moved in order in a logically circular order in a direction associated with the directional flick command. Alternatively, it may be detected that the movement command is a hold and move command based on a predefined period of time elapsing since the movement command was initiated, such as the user pressing one part of the display area and waiting 2, 3 or more seconds, etc. As a result, the processing device may move at least one of the plurality of subpages out of the sequence of subpages based on the hold and move command and allow it to be dragged and dropped at a desired location or trashed from the sequence. The sequence may then reorder and re-establish a sequential order after the subpage has been moved into a new position. The subpages stored in memory are designated as ready or idle. The ones that are next in sequence to be moved onto the display area may be designated as ready and may not require any information retrieval or rendering prior to be shifted into the display area. The subpages that are not next in sequence may be moved first from an idle state to a ready state which may require some rendering or information retrieval prior to preparing the idle subpages for display. In general, the idle subpages must be modified to a ready status prior to be displayed on the display.

Figure 8:
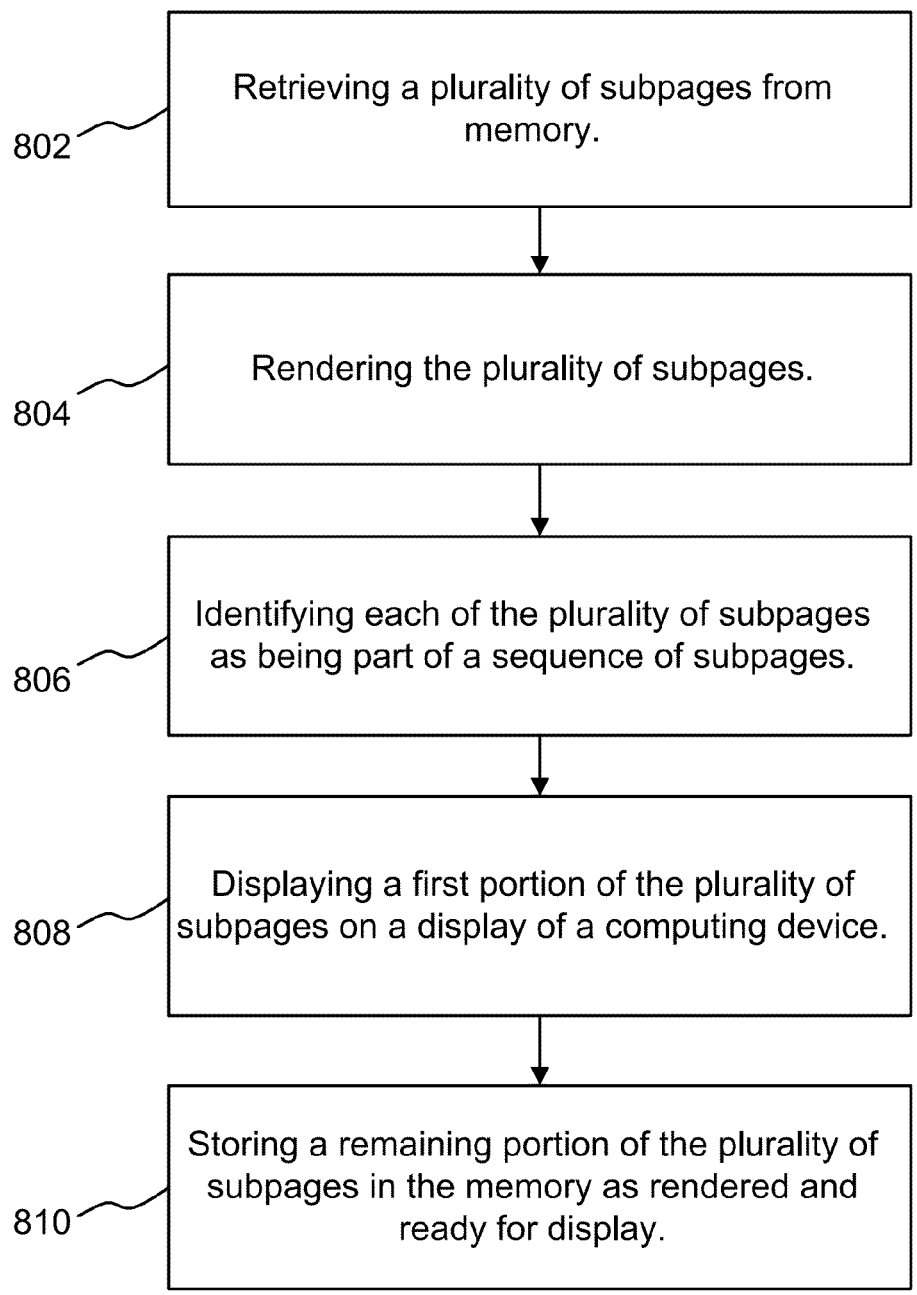
FIG. 8 illustrates an example flow diagram of an example method of operation, according to example embodiments.

FIG. 8 is a flow diagram illustrating an example set of operations according to an example method of operation 800. Referring to FIG. 8, the example method may include retrieving a plurality of subpages from memory, at operation 802. The method may also include rendering the plurality of subpages at operation 804, identifying each of the plurality of subpages as being part of a sequence of subpages at operation 806, displaying a first portion of the plurality of subpages on a display of a computing device, at operation 808, and storing a remaining portion of the plurality of subpages in the memory as rendered and ready for display at operation 810.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 9 illustrates an example network element 900, which may represent any of the above-described computing devices, etc.

Figure 9:
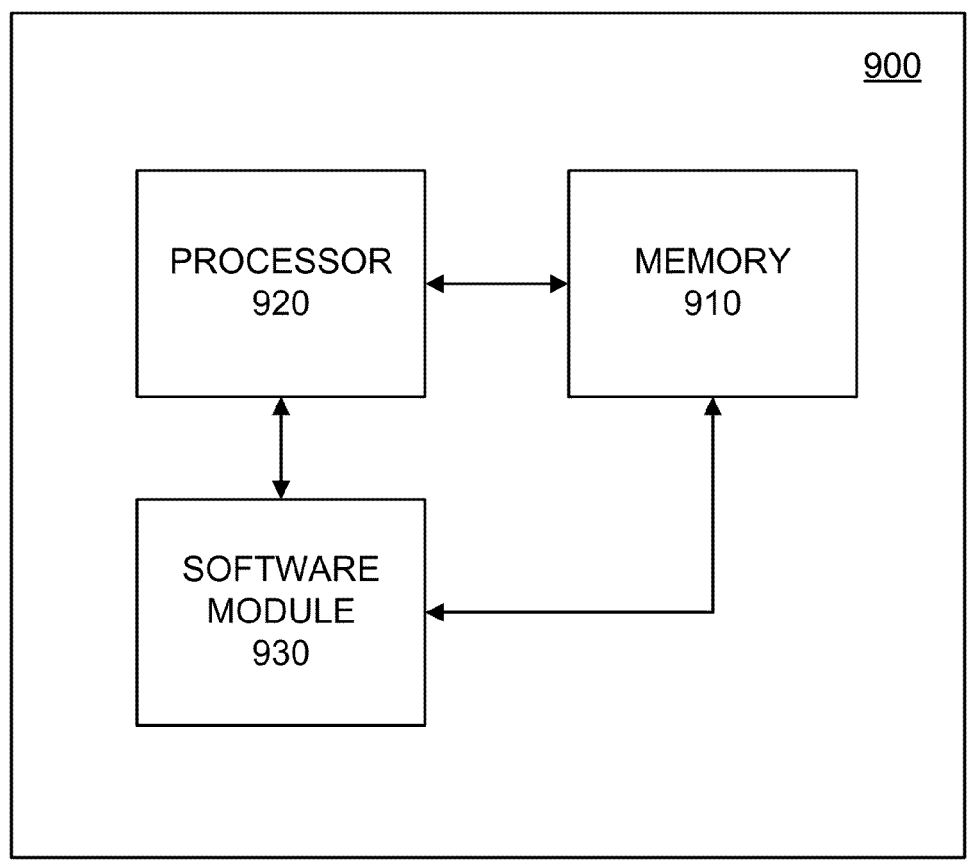
FIG. 9 illustrates an example network entity device configured to store instructions, software, and corresponding hardware for executing the same, according to example embodiments of the present invention.

As illustrated in FIG. 9, a memory 910 and a processor 920 may be discrete components of the network entity 900 that are used to execute an application or set of operations. The application may be coded in software in a computer language understood by the processor 920, and stored in a computer readable medium, such as, the memory 910. The computer readable medium may be a non-transitory computer readable medium that includes tangible hardware components in addition to software stored in memory. Furthermore, a software module 930 may be another discrete entity that is part of the network entity 900, and which contains software instructions that may be executed by the processor 920. In addition to the above noted components of the network entity 900, the network entity 900 may also have a transmitter and receiver pair configured to receive and transmit communication signals (not shown).

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the systems illustrated in the drawings can be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method comprising:
   retrieving a plurality of subpages from memory;
   rendering the plurality of subpages;
   identifying each of the plurality of subpages as being part of a sequence of subpages;
   displaying a first portion of the plurality of subpages on a display of a computing device;
   storing a remaining portion of the plurality of subpages in the memory as rendered and ready for display;
   receiving a movement command;
   retrieving at least one of the remaining portion of the plurality of subpages from the memory;
   displaying the at least one of the remaining portion of the plurality of subpages on the display responsive to the received movement command; and
   moving the sequence of subpages in a circular order in a direction associated with the movement command.

2. The method of claim 1, wherein the plurality of subpages correspond to a plurality of webpages.

3. The method of claim 1, further comprising:
   detecting that the movement command is a directional flick command.

4. The method of claim 3, wherein the directional flick command is at least one of up, down, left and right.

5. The method of claim 1, further comprising:
   detecting that the movement command is a hold and move command based on a predefined period of time elapsing since the movement command was initiated; and
   moving at least one of the plurality of subpages out of the sequence of subpages based on the hold and move command.

6. The method of claim 1, wherein a portion of the remaining portion of the plurality of subpages stored in the memory are designated as ready and are moved into the display, and all other of the plurality of subpages stored in the memory are

9 designated as idle and must be modified to a ready status prior to being displayed on the display.

7. An apparatus comprising:
a memory;
a display; and
a processor configured to
retrieve a plurality of subpages from the memory,
render the plurality of subpages,
identify each of the plurality of subpages as being part of a sequence of subpages,
display a first portion of the plurality of subpages on the display,
store a remaining portion of the plurality of subpages in the memory as rendered and ready for display,
receive a movement command,
retrieve at least one of the remaining portion of the plurality of subpages from the memory,
display the at least one of the remaining portion of the plurality of subpages on the display responsive to the received movement command, and
move the sequence of subpages in a circular order in a direction associated with the movement command.

8. The apparatus of claim 7, wherein the plurality of subpages correspond to a plurality of webpages.

9. The apparatus of claim 7, wherein the processor is further configured to detect that the movement command is a directional flick command.

10. The apparatus of claim 9, wherein the directional flick command is at least one of up, down, left and right.

11. The apparatus of claim 7, wherein the processor is further configured to detect that the movement command is a hold and move command based on a predefined period of time elapsing since the movement command was initiated, and move at least one of the plurality of subpages out of the sequence of subpages based on the hold and move command.

12. The apparatus of claim 7, wherein a portion of the remaining portion of the plurality of subpages stored in the memory are designated as ready and are moved into the display, and all other of the plurality of subpages stored in the memory are designated as idle and must be modified to a ready status prior to being displayed on the display.

13. A non-transitory computer readable storage medium configured to store instructions that when executed cause a processor to perform:

10 retrieving a plurality of subpages from memory;
rendering the plurality of subpages;
identifying each of the plurality of subpages as being part of a sequence of subpages;
displaying a first portion of the plurality of subpages on a display of a computing device;
storing a remaining portion of the plurality of subpages in the memory as rendered and ready for display;
receiving a movement command;
retrieving at least one of the remaining portion of the plurality of subpages from memory;
displaying the at least one of the remaining portion of the plurality of subpages on the display responsive to the received movement command; and
moving the sequence of subpages in a circular order in a direction associated with the movement command.

14. The non-transitory computer readable storage medium of claim 13, wherein the plurality of subpages correspond to a plurality of webpages.

15. The non-transitory computer readable storage medium of claim 13, wherein the processor is further configured to perform:
detecting that the movement command is a directional flick command.

16. The non-transitory computer readable storage medium of claim 15, wherein the directional flick command is at least one of up, down, left and right.

17. The non-transitory computer readable storage medium of claim 13, further comprising:
detecting that the movement command is a hold and move command based on a predefined period of time elapsing since the movement command was initiated; and
moving at least one of the plurality of subpages out of the sequence of subpages based on the hold and move command, and wherein a portion of the remaining portion of the plurality of subpages stored in the memory are designated as ready and are moved into the display, and all other of the plurality of subpages stored in the memory are designated as idle and must be modified to a ready status prior to being displayed on the display.

\* \* \* \* \*